April 10, 1934.　　　E. C. SHANK　　　1,954,228
SPOOL HOLDER
Filed March 17, 1932　　3 Sheets-Sheet 1

INVENTOR
Edward C. Shank
BY
ATTORNEY

April 10, 1934.   E. C. SHANK   1,954,228
SPOOL HOLDER
Filed March 17, 1932   3 Sheets-Sheet 2
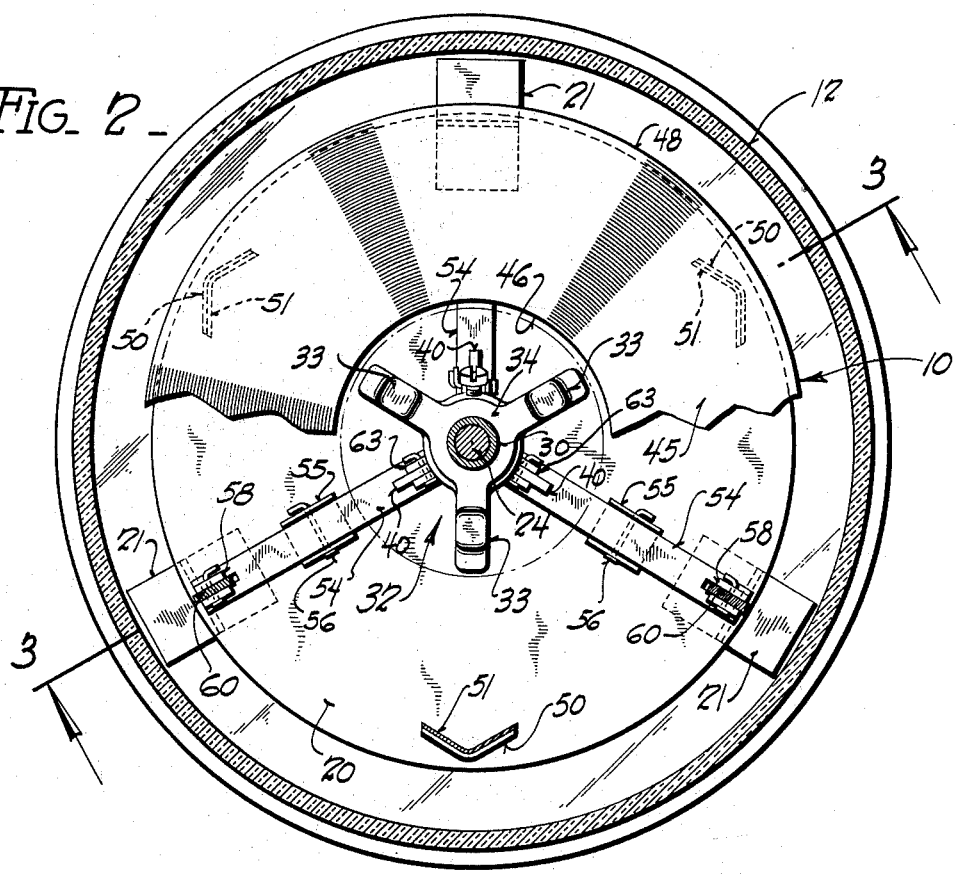
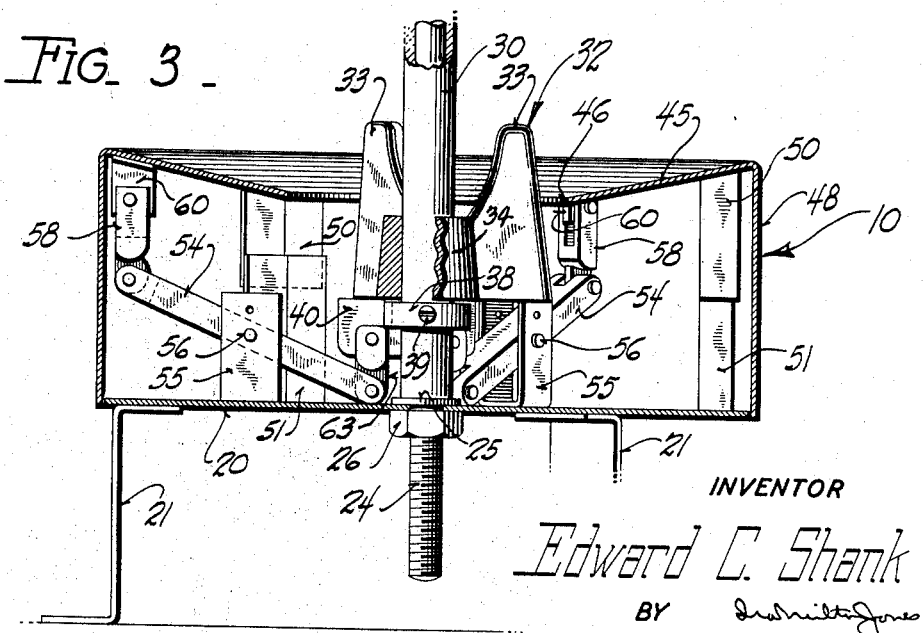
INVENTOR
Edward C. Shank
BY
ATTORNEY April 10, 1934.　　　　　E. C. SHANK　　　　　1,954,228
SPOOL HOLDER
Filed March 17, 1932　　　3 Sheets-Sheet 3
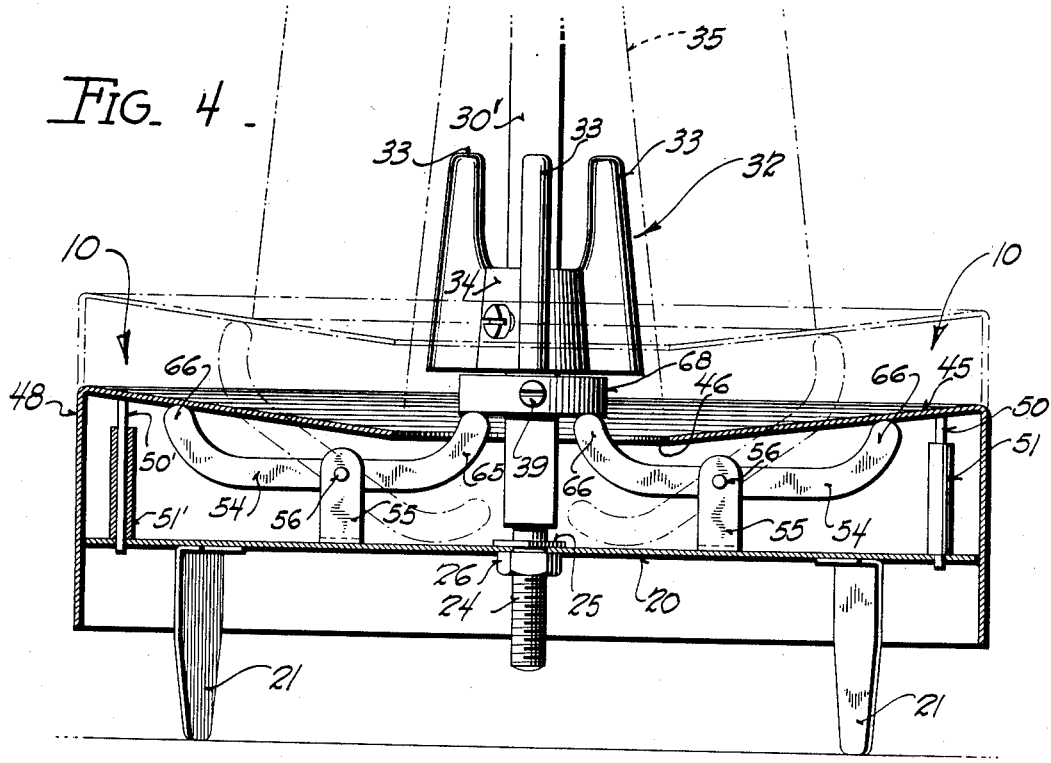
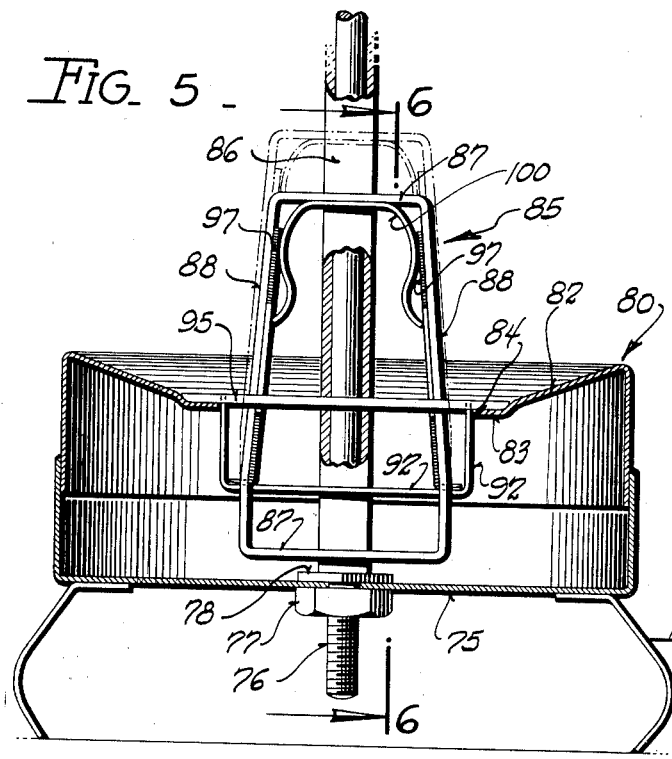
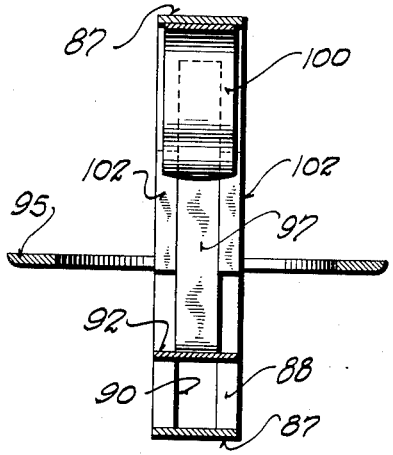
INVENTOR
Edward C. Shank
BY
ATTORNEY Patented Apr. 10, 1934

1,954,228

UNITED STATES PATENT OFFICE 1,954,228

SPOOL HOLDER

Edward C. Shank, Milwaukee, Wis.

Application March 17, 1932, Serial No. 599,389

10 Claims. (Cl. 242—132)

This invention relates to spool holders and more particularly to spool holders to be used in connection with knitting machines or the like.

In spool holders heretofore used in knitting machines, great difficulty has been experienced in the yarn under-whipping or catching beneath the bottom edge of the spool and breaking off. Various attempts have been made to overcome this, the principal of which is to imbed the cone upon which the spool is wound in pebbles or other suitable material. This has been found unsatisfactory due to the jar of the machine shifting the pebbles and exposing the under edge of the spool, which again permits under-whipping.

It is an object of the present invention to produce a spool holder which will keep a plate member positively in contact with the edge of the material on the spool and thereby prevent the thread from under-whipping.

These and other objects, the nature of which will become apparent upon consideration of the following description, are accomplished by means of a structure such as shown in the accompanying drawings and fully described in the following specification, invention residing in certain novel features which will be particularly pointed out in the appended claims.

In the drawings:

Figure 2 is a cross sectional view taken on the line 2—2 of Fig. 1;

Figure 3 is a cross section on the line 3—3 of Fig. 2;

Figure 4 is a view similar to Fig. 3, showing a modified form of the invention;

Figure 5 is another modification; and

Figure 6 is a cross section on the line 6—6 of Fig. 5.

Figure 1:
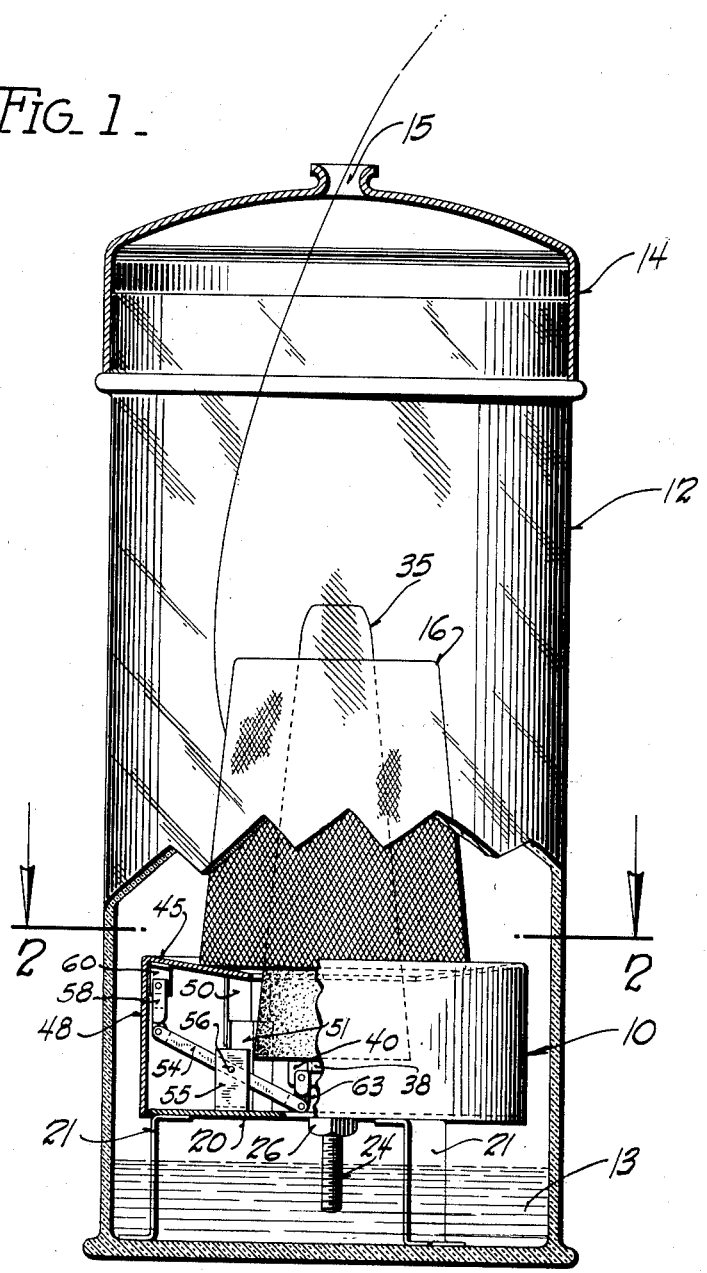
Figure 1 is an elevational view partly in section, of a humidor jar and spool holder embodying the present invention shown assembled in its casing.

Referring to the accompanying drawings in which like numerals indicate like parts throughout the several views, and particularly to Figs. 1, 2 and 3, the spool holder, generally designated 10, is enclosed preferably in a glass casing 12 containing a quantity of water 13 in the bottom thereof to provide proper humidity for the yarn.

A cover 14 fits on the glass casing and is provided with a central aperture 15 in the top thereof through which yarn 16 may pass.

Referring to Figs. 2 and 3, the spool holder is supported on a base plate 20 through a plurality of legs 21 attached thereto about the periphery thereof, the legs 21 supporting the base plate 20 above the top of the water 13 in the glass container 12. The legs may be made of resilient material and either bowed outwardly as shown in Fig. 5, or turned outwardly as shown in Figs. 1 to 4 so as to contact the sides of the casing 12 to hold the spool holder 10 firmly in position within the casing.

A shaft 24 is supported in the base plate between a pair of nuts 25 and 26 which hold the shaft permanently at right angles to the base plate 20. A sleeve 30 is rotatably mounted on the shaft and has a cone gripping member 32 adjustably fixed thereon. The cone gripping member 32 may, if desired, comprise three or more radiating fins 33 fixed to a central hub, having the outer edge thereof lying on a conical surface concentric to the shaft 24, a set screw 34 serving to hold the member 32 in fixed position on the sleeve 30. The spool core 35, shown in Fig. 1, is of hollow conical shape and fits down over the fins 33 which grip the interior of the cone to hold the spool in fixed position in relation to the sleeve 30. The sleeve 30 has a collar 38 adjustably fixed thereto through a set screw 39, the sleeve 30 having formed thereon three or more radiating projections 40 for a purpose set forth below.

A cup-shaped member 45 having an aperture 46 therethrough of a diameter slightly greater than the maximum diameter of the cone 35, has a depending cylindrical skirt 48 which encircles the base plate 20. The skirt serves the dual purpose of preventing any considerable amount of the water 13 from entering the working portion of the spool holder and preventing the yarn from whipping around under the edge in a manner similar to under-whipping the spool.

The upper surface of the member 45 is preferably made of a dish-shaped or conical plate to insure the lower edge of the yarn on the spool remaining in contact therewith. Cooperating guide members 50 and 51 are fixed to the base and plate respectively and may be of any suitable shape to insure parallel motion and centering of the cup-shaped member 45 relative to the base plate 20 and the shaft 24. While the centering device has been shown as being angular plates, in Figs. 2 and 3, it will be understood that, if desired, they may also be a rod 50' and sleeve 51' such as shown in Fig. 4 or other suitable members.

The cone gripping member and the cup-shaped protector 45 are both movable relative to the base plate 20 but in opposite directions. The movement of the two members is intercontrolled through a plurality of levers 54 mounted in U-shaped brackets 55 from the base plate 20. The levers 54 are pivoted on pins 56 passing therethrough and secured in the brackets 55.

In the form shown in Figs. 2 and 3, the levers 54 actuate the cup-shaped protector 45 through links 58 which are pivotally connected to the cup-shaped protector 45 through ears 60, and which are pivotally connected to the outer end of the lever 54 through a forked end thereon. The inner ends of the levers 54 are connected in a similar manner to the sleeve 38 through links 63 which are in turn pivotally connected to the levers 54 and to the depending ears 40 fixed on the sleeve 38, so that downward movement of the cone gripping member 32 causes corresponding upward movement of the cup-shaped protector 45.

The form shown in Fig. 4 is comparable to that shown in Figs. 2 and 3 with the slight change in the levers 54. In Fig. 4, the levers 54 are shown as having upwardly extending ends 65 and 66 which are slidably connected with a collar 68 and the inner conical surface of the housing 45. The collar 68 is attached onto a sleeve 30′ similar to the sleeve 30 in Figs. 2 and 3 by means of the set screw 39. The collar 68 differs from the collar 38 in being wider so as to give a broad lower surface upon which the lever may slide and in not having the projections 40 attached thereto. The collar 68 rides on top of the inner upwardly extending ends 65 of the levers so as to force the outer ends of the levers upwardly upon downward movement of the collar 68. The outer upwardly extending ends 66 of the levers 54 ride on the underside of the conical surface of the cup-shaped member 45 to actuate that member in a direction opposite to the movement of the collar 68.

The form of the invention disclosed in Figs. 5 and 6 is somewhat different from that shown in Figs. 2, 3 and 4. Referring particularly to Fig. 5, it will be seen that there is an upstanding cup-shaped member 75 forming a base similar to the base plate 20 and in which a vertical shaft 76 may be fixed by a pair of lock nuts 77 and 78 so as to maintain the shaft vertical in a manner similar to the shaft 24.

A downturned cup portion 80 is fixed to the upstanding cup-shaped member 75 about the periphery of the cylindrical portions thereof. The member 80 is formed with a conical upper surface 82 which terminates in a horizontal shelf 83 adjacent an aperture 84 through the side 82.

The cone gripping member, generally designated 85 is mounted on a sleeve 86 and is composed of a substantially rectangular frame having parallel sides 87—87 at the top and bottom and tapering sides 88—88 which correspond to the conical angle so that the cone will fit down tightly over the sides 88. As shown in Fig. 6, the sides 88 are provided with a slot 90 through which a saddle 92 passes. The saddle has upstanding legs spaced apart a distance approximately equal to the maximum diameter of the outside of the cone and attached at their upper ends to an annulus 95, the inner diameter of which is equal to or slightly greater than the maximum outside diameter of the cone.

A pair of longitudinal springs 97 and 98 are fastened at the lower ends thereof to the saddle 92 and may, if desired, turn outwardly through the slot 90. The springs 97 extend upwardly along the sides 88 and are held in close frictional engagement with the walls 88 by a spring 100, the spring 100 being attached to the upper wall 87 and pressing the springs 97 and 98 outwardly against the sides 88. The leaf springs 97 and 98 are flanked by strips 102 on either side thereof which prevent the movement of the spring 97 out of engagement with the spring 100.

*Operation*

In the device shown in Figs. 2 and 3, the spool, comprising the cone and the yarn wound thereon, is forced onto the cone gripping member 32 where it is held by the fins 33 in a vertical position. The cone is then forced down with the lower end of the cone projecting beneath the aperture 46 in the top of the cup-shaped member 45. The member 32 in descending raises the member 45 until the outer edge of the yarn comes in contact with the upper surface of the cup-shaped member 45. The weight of the spool is such that it is sufficient of itself to lower the cone gripping member 32 to constantly maintain the top of the cup-shaped member 45 in contact with the outer edge of the spool.

In the device shown in Fig. 4, it is possible to remove the cone gripping member 32 from the guide rod 24 and adjust it in the cone and insert the entire spool thereafter onto the spool holder 10. As in the form of the invention shown in Fig. 1, the lower end of the conical member 35 is then forced downwardly through the aperture 46 in the top of the cup-shaped member 45 until the yarn touches the outer edge of the conical surface. The spool is of sufficient weight to keep the member 45 in raised position with the top surface thereof contacting the outer edge of the yarn.

In the device shown in Fig. 6, the cone gripping member 86 together with the guide sleeve 86 is removed from the shaft 76 and the cone placed on the cone gripping member with the sides of the cone in engagement with the sides 88 of the polygonal frame. The conical member is then forced downwardly relative to the collars 95 so that the lower edge of the cone is gripped between the extension of the sides 88 and the vertical legs of the U-shaped saddle 92. The cone gripping member is then replaced on the guide rod 76 so that the edge of the yarn on the spool rests on the upper conical surface 82 of the cup-shaped member 80. The ring 95 may be spaced above the shoulder 83 and come in contact with the shoulder 83 only when the yarn is wound down below the outer periphery of the ring 95. The weight of the yarn continually keeps the lower edge thereof in contact with the conical surface 82 due to the slidability of the sleeve 86 on the rod 76.

Having thus described the invention, it will be readily apparent to one skilled in the art that there has been provided a relatively simple device which constantly and positively keeps a plate on the bottom of the spool of yarn, thereby preventing the yarn from under-whipping and breaking off.

It will also be apparent that this represents a distinct improvement over structures heretofore used and it is not, therefore, desired to limit the invention to the precise form herein shown and described, but only by the scope of the appended claims.

What is claimed as new and desired to secure by Letters Patent is:

1. In a supporting device for a spool of yarn including a hollow cone on which the yarn is wound, the combination of a cone gripping member comprising a collar having a plurality of radiating ribs, each of said ribs having the outer edge thereof lying on an element of the cone, said cone gripping member being movable on a substantially vertical axis, a plate member movable parallel to itself along said axis, and means interconnecting the plate member and the cone gripping member whereby movement of one of said members in one direction causes corresponding movement of the other said member in the opposite direction.

2. In a device for supporting a spool of yarn including a core on which the yarn is wound, the combination of an axially movable core gripping member, a plate having an aperture therein to receive the core, said plate being mounted substantially concentrically about said core gripping member for movement axially thereto and means connecting the core gripping member with the plate so that movement of the core gripping member by the weight of said spool retains said plate in contact with the lower edge of the yarn on the spool whereby under-whipping is precluded.

3. In a supporting device for a spool of yarn including a core on which the yarn is wound, the combination of a core gripping member, a plate member, means interconnecting said core gripping member and said plate member whereby movement of one of said members in one direction causes a corresponding movement of the other said member in the opposite direction.

4. In a supporting device for a spool of yarn including a hollow cone on which the yarn is wound, the combination of a base plate, a shaft supported from said base plate, a cone gripping member including a collar and a plurality of radiating ribs on said collar, each of said ribs having the outer edge thereof lying on an element of the cone, said cone gripping member being mounted for substantially vertical movement on said shaft, a plate member mounted substantially concentrically about said cone gripping member, and means interconnecting said members whereby movement of one of said members in one direction causes a corresponding movement of the other said member in the opposite direction.

5. In a supporting device for a spool of yarn including a core on which the yarn is wound, the combination of a base, a shaft supported from said base, a core gripping member mounted on said shaft, a plate mounted substantially concentrically about said core gripping member, a lever pivotally mounted intermediate the ends thereof from said base, and means connecting the opposite ends of said lever with said core gripping member and said plate member respectively whereby movement of one of said members in one direction causes a corresponding movement of the other said member in the opposite direction.

6. In a supporting device for a spool of yarn including a hollow cone on which the yarn is wound, the combination of a base, a shaft mounted on said base, a cone gripping member including a collar and a plurality of radiating ribs, each of said ribs having the outer edge thereof lying on an element of the cone, said cone gripping member being slidably mounted on said shaft, a plate member, a lever pivotally mounted intermediate the ends thereof from said base, and means pivotally connecting the opposite ends of said lever with said cone gripping member and said plate member respectively whereby movement of one of said members in one direction causes a corresponding movement of the other said member in the opposite direction.

7. In a supporting device for a spool of yarn including a core on which the yarn is wound, the combination of a base plate, a core gripping member mounted from said base plate, a plate member mounted from said base plate, means connecting said members whereby relative movement of one of said members causes corresponding movement of the other said member in the opposite direction and means supporting said base plate, said last named means comprising a resilient centering means for said device in a receptacle.

8. In a supporting device for a spool of yarn including a core on which the yarn is wound, the combination of a base plate, a shaft mounted on said base plate, a core gripping member mounted for movement on said shaft, a plate member having a skirt thereon encircling the said base plate, and means interconnecting said members whereby movement of one of said members in one direction causes corresponding movement of the other said member in the opposite direction.

9. In a supporting device for a spool of yarn including a core on which the yarn is wound, the combination of a base, a shaft mounted on said base, a core gripping member mounted for movement on said shaft, a plate member having a depending skirt encircling said base, a lever pivotally mounted intermediate the ends thereof from said base, and means slidably connecting the opposite ends of the lever with said core gripping member and said plate member respectively, whereby movement of one of said members in one direction causes a corresponding movement of the other said member in the opposite direction.

10. In a supporting device for a spool of yarn, including a core on which the yarn is wound, a movable carrier with which the core is engageable so as to mount the spool of yarn in an upright manner, said carrier being movable by the weight of the spool of yarn, a plate member engageable with the bottom face of the spool of yarn to prevent underwhipping, and means operable by the movement of the carrier effected by the weight of the spool to move the plate member toward the spool to maintain the same in contact with the bottom face of the spool at all times.

EDWARD C. SHANK.